United States Patent [19]

King

[11] 4,292,163

[45] Sep. 29, 1981

[54] LIQUID TREATER HAVING ELECTRODE STRIPPER

[76] Inventor: Arthur S. King, 8021 Cherokee La., Leawood, Kans. 66206

[21] Appl. No.: 112,549

[22] Filed: Jan. 16, 1980

[51] Int. Cl.³ ............................ B03C 5/02; C02F 1/46
[52] U.S. Cl. ..................................... 204/304; 204/149; 204/275
[58] Field of Search .................... 204/188, 302–308, 204/149, 275

[56] References Cited

U.S. PATENT DOCUMENTS 3,857,770  12/1974  Keller .................................. 204/188
4,055,479  10/1977  King .................................... 204/302
4,164,460   8/1979  Jordan et al. ...................... 204/180 R

FOREIGN PATENT DOCUMENTS 54-37103  11/1979  Japan ................................... 204/304

Primary Examiner—Delbert E. Gantz
Assistant Examiner—William Leader
Attorney, Agent, or Firm—Schmidt, Johnson, Hovey & Williams

[57] ABSTRACT

In an electrolytic treater the molecular particles contained in waste liquid are encouraged to move into physical contact with the rotating primary electrode for electronation because the electrode is continuously and mechanically stripped free of any film of adhering liquid or other particles before its surface next passes through the electric field between the electrodes. Electrical action on the liquid is maximized by reducing the incoming volume of liquid to a thin layer as it moves through a restricted gap between the two electrodes.

2 Claims, 4 Drawing Figures

LIQUID TREATER HAVING ELECTRODE STRIPPER

TECHNICAL FIELD

This invention relates to the field of treating waste liquids with electric fields, such treatment being particularly beneficial in causing particulate matter contained in such liquids to flocculate and subsequently settle out so as to permit the clarified liquid to be discharged without harm into streams and rivers. In particular, the invention involves a way of promoting the electronation which occurs at the primary electrode of the treater so as to therefore maximize the effect on the waste liquid being treated.

BACKGROUND ART

It is a scientifically known fact that in electrolytic reactions, the ions contained within waste water being treated must move to the surface of the electrode, get absorbed, undergo the reaction, and move away. But this activity is hindered by the fact that the naturally polar water molecules have a tendency to cling to the surface of the electrode to thereby cover up sites otherwise available for achieving contact between the solvated ions and the electrode surface. Furthermore, once engagement has been made between the solvated ions and the electrode surface, there is no particular inducement for the ions to then move away. Consequently, other ions are inhibited in their ability to make contact with the electrode surface, to the end that the effectiveness of the treatment suffers.

SUMMARY OF THE PRESENT INVENTION

Accordingly, one important object of the present invention is to provide a way of promoting uninhibited movement of the ionic particles toward and away from the electrode surface in an electrolytic action so as to maximize the effects of the electrolytic action on the liquid being treated. To this end, the primary electrode of the system is made rotary in nature and is caused to bear against a stationary, non-electrically charged stripper that is located at a point beyond the area at which the electrolytic action takes place between the primary electrode and a second, oppositely charged electrode. Thus, once the electrolytic action has occurred on the primary electrode, the stripper removes adhering water molecules and reacted products from the surface of the primary electrode so that the surface is cleaned and ready for again passing beneath the other electrode to perform the electrolytic process.

By placing the rotating primary electrode closely adjacent to the stationary, oppositely charged electrode, a restricted gap is defined through which the incoming liquid must pass, and this causes the liquid to be reduced in volume to a relatively thin layer as it moves through the gap, thus concentrating the electrical impact upon a relatively small volume of the liquid at any one time. This additionally promotes the electrolytic action on the treated liquid.

DETAILED DESCRIPTION

Figure 1:
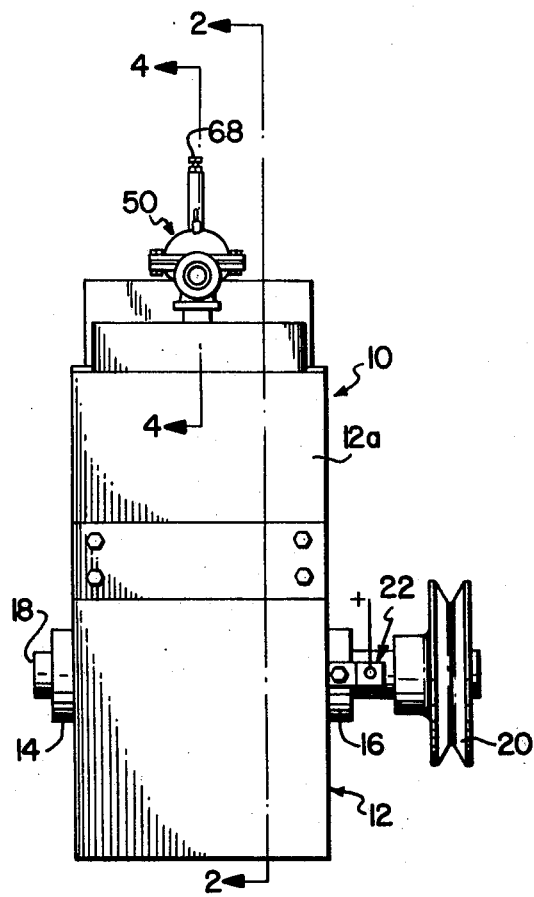
FIG. 1 is a schematic elevational view of a treater embodying the principles of the present invention.

The treater 10 includes a housing 12 having a pair of bearings 14 and 16 which journal a shaft 18 for rotation about a substantially horizontal axis. The shaft 18 projects outwardly beyond at least one side wall of the housing 12 and has a sleeve 20 rigidly affixed thereto for the purpose of receiving driving input from a belt or the like (not shown) to rotate the shaft 18 at a selected speed. A brush assembly 22 situated between the sheave 20 and the housing 12 includes a contact member 24 housed within an electrically insulated socket 26, said contact member 24 being yieldably biased into wiping engagement with the shaft 18 by a coil spring 28 contained within the socket 26. The contact member 24 is electrically connected to one side of a source of electrical potential by a lead 30 either connected directly to the member 24 or indirectly via the spring 28, the member 24 thereby likewise connecting the shaft 18 electrically to the same side of the source of electrical potential as the contact member 24.

Figure 2:
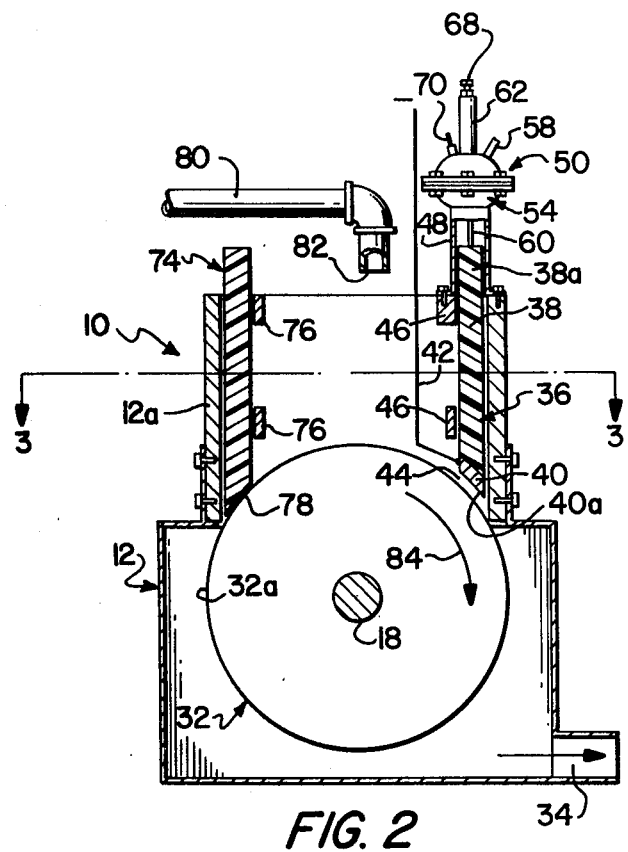
FIG. 2 is a vertical cross-sectional view through the treater taken substantially along line 2—2 of FIG. 1.

A primary electrode 32 of cylindrical configuration is contained within the housing 12 and is rigidly affixed to the shaft 18 for rotation with the latter. The axis of rotation of the shaft 18 and the longitudinal axis of the cylindrical electrode 32 coincide. The electrode 32 is spaced above the bottom of the housing 12 as illustrated in FIG. 2, said housing 12 being provided with an outlet 34 for a purpose which will hereinafter be described. Electrode 32 is charged by the brush assembly 22, preferably positively.

The housing 12 has an upper, tubular receiving portion 12a of dielectric material which projects upwardly beyond the upper extremities of the electrode 32 and which houses an electrode assembly 36 cooperating with the primary electrode 32 during operation of the treater 10. The assembly 36 includes a platelike support 38 of dielectric material having a lower end to which is attached a conductive electrode 40 connected in any suitable way, such as by a lead 42, to the opposite side of the source of electrical potential for the primary electrode 32. Preferably, electrode 40 is negatively charged. The electrode assembly 36 extends along the full length of the primary electrode 32 and is so supported that the exposed lower surface 40a is maintained in close proximity to the peripheral surface 32a of the electrode 32. Consequently, a space or gap 44 of restricted dimensions is defined between the electrode surfaces 32a and 40a.

The electrode assembly 36 is supported in upright condition by suitable structure such as transverse guides 46 which confine the electrode assembly 36 against lateral movement yet permit it to move vertically under certain circumstances. In this regard, there is a centrally disposed, uppermost cylindrical extension 38a of the support 38 which projects up into the receiving cylinder 48 of a control device 50 attached to the housing 12 and projecting upwardly therefrom. The control device 50 also includes a diaphragm 52 spanning an enlarged chamber 54 that has one side 56 thereof connected to a source of positive air pressure (not shown) via an inlet 58. Diaphragm 52 is then in turn mechanically connected to the upper end of extension 38a of the electrode support 38 by a connecting rod 60 such that any movement of the diaphragm 52 also causes movement of the electrode support 38 and hence also the electrode 40.

Figure 4:
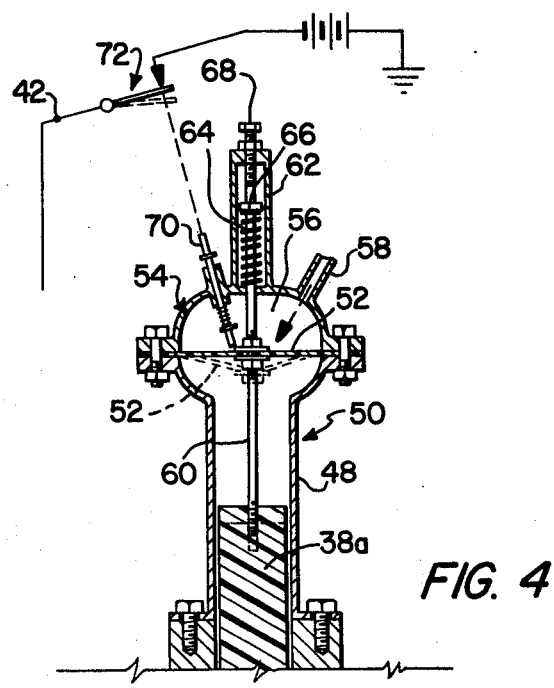
FIG. 4 is an enlarged fragmentary vertical cross-sectional view through mechanism for selectively shifting the normally stationary electrode of the system into engagement with the rotary electrode and taken substantially along line 4—4 of FIG. 1.
Figure 3:
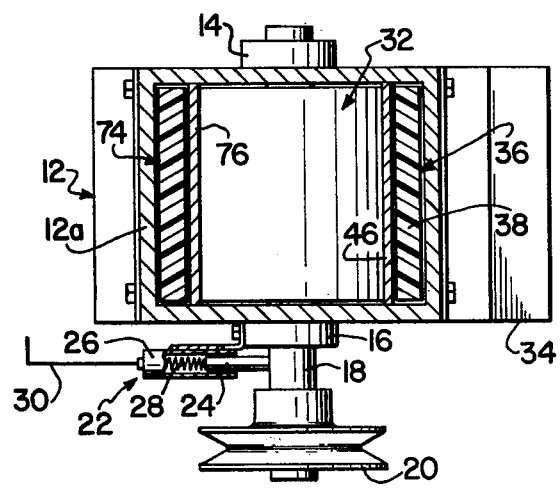
FIG. 3 is a horizontal cross-sectional view through the treater taken substantially along line 3—3 of FIG. 2.

The connecting rod 60, while being firmly secured to the diaphragm 52, passes through the latter and extends up into an upstanding receptacle 62 which houses a compression spring 64 encircling that portion of the rod 60 which projects into the receptacle 62. The spring 64 at its lower end bears against the wall of the chamber 54 and at its other end bears against a collar 66 on the rod 60 so as to bias the latter yieldably upwardly against an adjustable stop 68 threaded into the upper end of the receptacle 62 and projecting into the operating space of the rod 60. As illustrated in FIG. 4, with the stop 68 positioned as shown, the diaphragm 52 is disposed in its solid line position which corresponds to the condition of things in FIG. 2 wherein the gap 44 is maintained between the electrode surfaces 32a and 40a. On the other hand, when the diaphragm 52 is in its dotted line position of FIG. 4, the electrode 40 will have shifted down into wiping engagement with the electrode 32 such that the gap 44 will not be present under that set of circumstances.

An operating rod 70 as shown in FIG. 4 is spring biased down into engagement with the diaphragm 52 yet is linked mechanically to a schematically shown switch 72 between lead 42 and the source of electrical potential, the rod 60 being so linked with the switch 72 as to open the latter when the diaphragm 52 is in its dotted line position so as to thereby disconnect lead 42 from the source of electrical potential and to subsequently close the switch 72 when the diaphragm is in its solid line position of FIG. 4 so as to reconnect lead 42 with the source of electrical potential.

Also positioned within the upper portion 12a of the housing 12 and disposed in an upright condition is a platelike stripper member 74 of dielectric material. The stripper 74 is confined against lateral movement by transverse guides 76 and has a lower end 78 which bears against the surface 32a of electrode 32 in constant wiping engagement. The stripper 74 is of such dimension as to contact the electrode 32 over its entire length and is biased by its own weight against the surface 32a, although additional yieldable biasing means could of course also be utilized. A pipe 80 or the like dumps incoming waste liquid into the housing 12 within its upper portion 12a, the discharge end 82 of the pipe 80 being so located with respect to the axis of rotation of the electrode 32 that incoming waste water is introduced onto the electrode 32 at a point slightly past top dead center in such a way that the water will flow down toward the gap 44 instead of the opposite direction toward the stripper 74.

OPERATION

The discharge outlet 34 for the housing 12 is so sized relative to the gap 44 normally maintained between the electrode surfaces 32a and 40a that a substantial collection of liquid within the housing 12 is prevented. In fact, it is desirable that the water immediately pass out of the housing 12 through the outlet 34 after treatment between the electrodes 32 and 40. Preferably, outlet 34 has the capacity to discharge liquid at a faster rate than the rate of flow through gap 44. Consequently, the collecting water normally does not reach a depth in the bottom of the housing 12 which would cause the electrode 32 to even be partially immersed.

As waste water is introduced into the treater 10 via the pipe 80, it encounters the electrode 32 rotating in the direction of the arrow 84 in FIG. 2. Partly due to this direction of rotation and also due to the fact that the outlet 82 of pipe 80 is positioned to direct the water onto the "down" side of the electrode 32, the water flows to the gap 44 instead of to the stripper 74. A slight build-up of water may occur behind the gap 44, it being intended that the rate of incoming water should be just enough to keep the gap 44 filled on a constant basis and without causing the water to flow in a retrograde manner back toward the stripper 74.

The size of the gap 44 is preferably on the order of a fraction of one inch so that the water will be reduced in volume to a thin layer as it passes through the gap 44 and the electric field established by the oppositely charged electrodes 32 and 40. During the interval that the liquid is exposed to the electric field within the gap 44, electrolysis occurs if the waste liquid has sufficient impurity particles to comprise an electrolyte. As is well known, the ionic impurity particles move to the surface of an electrode during this process, and when physical contact is made, electronation occurs and the particle must thereupon move away from the electrode. Thus, in the treater 10, the ionic particles move into engagement with the electrode surface 32a in the region of the gap 44.

The polar water molecules in the waste water as well as the ionic particles moving into contact with the electrode surface 32a have a tendency to cling to the surface 32a even after the gap 44 has been left behind by the rotating electrode 32. Thus, although a substantial primary amount of the liquid gravitates from the rotating electrode 32 and is immediately discharged by the outlet 34 after passing through the gap 44, a certain minutely thin layer of water molecules and ionic particles adheres to the surface 32a and travels with the same on around to the stripper 74. But at that location, the physical wiping engagement between the lower end 78 of the stripper 74 and the electrode surface 32a causes the adhering water molecules and ionic particles to be forcibly scraped off the electrode 32 and to fall backwards into the bottom of the housing 12. Consequently, the stripped portion of the electrode surface 32a is substantially clean in readiness for next contacting the incoming waste liquid passing through the gap 44. This significantly promotes the free, uninhibited movement of the ionic particles into physical engagement with the surface 32a as the latter passes through the gap 44, thereby increasing the efficiency of the treater 10 and encouraging the ionic particles thus treated to flocculate and subsequently settle out of solution.

To some extent the electrode surface 40a may also become covered by an inhibiting layer of water molecules and ionic particles. Therefore, from time to time as may be necessary, the electrode 40 may be shifted into wiping engagement with the electrode 32 such that the frictional contact between the surfaces 32a and 40a will function to remove the adhering layer from the surface 40a. Such action may be accomplished by injecting a positive surge of air pressure into the chamber 54 of control device 50, causing the diaphragm 52 to be shifted downwardly to its dotted line position of FIG. 4 so as to thrust the electrode 40 against the electrode 32. At the same time, the switch 72 is opened by the connecting rod 70 so as to disconnect the lead 42 from the source of electrical potential. As soon as the positive surge of air pressure is removed, the coil spring 64 will return the diaphragm 52 back to its solid line position and the switch 72 will likewise be closed by the rod 70. The size of the gap 44 may be controlled by adjustment of the stop 68.

I claim:

1. In a device for electrically treating liquids, the combination of:
   a first generally cylindrical electrode mounted for rotation about a generally horizontal axis coinciding with the longitudinal axis of the electrode;
   means for supplying liquid onto the upper peripheral surface of said electrode during rotation thereof about said axis of rotation;
   a second, stationary electrode having a surface disposed in spaced opposition to said surface of the first electrode;
   means for holding said electrodes with their opposed surfaces spaced apart a fraction of an inch to define a restricted gap which receives the liquid and reduces the same in volume to a thin layer as it moves through said gap, thereby concentrating the effect of the electrodes;
   means for connecting said electrodes across a source of electrical potential for oppositely electrically charging the same and producing an electric field within said gap; and
   stripper means positioned to engage said surface of said one electrode at a point beyond said gap for removing adhering liquid and other materials from said surface of said one electrode following passage through said gap.

2. In a device as claimed in claim 1, wherein is further provided an outlet for treated liquid so sized relative to said gap as to have the capacity to discharge treated liquid from the device at a faster rate than the rate of liquid flow through said gap.

* * * * *